United States Patent [19]

Tillman

[11] Patent Number: 5,185,934
[45] Date of Patent: Feb. 16, 1993

[54] FLEXIBLE EXTENSION FOR A RECIPROCATING TOOL

[76] Inventor: Eric L. Tillman, 614 Herrick St., Pascagoula, Miss. 39567

[21] Appl. No.: 826,382

[22] Filed: Jan. 27, 1992

[51] Int. Cl.[5] .................... B23D 49/06; B23D 49/04; B23D 49/10; B23B 29/00
[52] U.S. Cl. ......................................... 30/392; 30/393; 30/394; 30/371
[58] Field of Search ................ 30/371, 392, 393, 394; 29/426.4, 402.3

[56] References Cited

U.S. PATENT DOCUMENTS

| | | | |
|---|---|---|---|
| 1,362,628 | 12/1920 | Kunitz | 30/394 |
| 1,626,503 | 4/1927 | Bjorklund . | |
| 3,155,011 | 11/1964 | Hyskell | 30/371 |
| 3,657,813 | 4/1972 | Knight | 30/392 |
| 3,927,893 | 12/1975 | Dillon et al. | 30/392 |
| 4,055,894 | 11/1977 | Saxe | 30/394 |
| 4,841,643 | 6/1989 | Colella et al. . | |
| 4,864,727 | 9/1989 | Chu | 30/393 |
| 4,955,124 | 9/1990 | Asbery . | |
| 5,083,376 | 1/1992 | Lentino | 30/392 |

*Primary Examiner*—Douglas D. Watts
*Assistant Examiner*—Paul M. Heyrana
*Attorney, Agent, or Firm*—Richard C. Litman

[57] ABSTRACT

A flexible extension for a hand held power tool is disclosed. The extension has a single flexible reciprocating rod to transmit motion generated by the power tool to a cutting tool at the other end of the extension. A handle grip assembly surrounds the extension adjacent the reciprocation tool. In use, the operator holds the power tool in one hand and the handle grip in the other. The extension permits useful work to be done in close quarters or an otherwise inaccessible location.

12 Claims, 3 Drawing Sheets

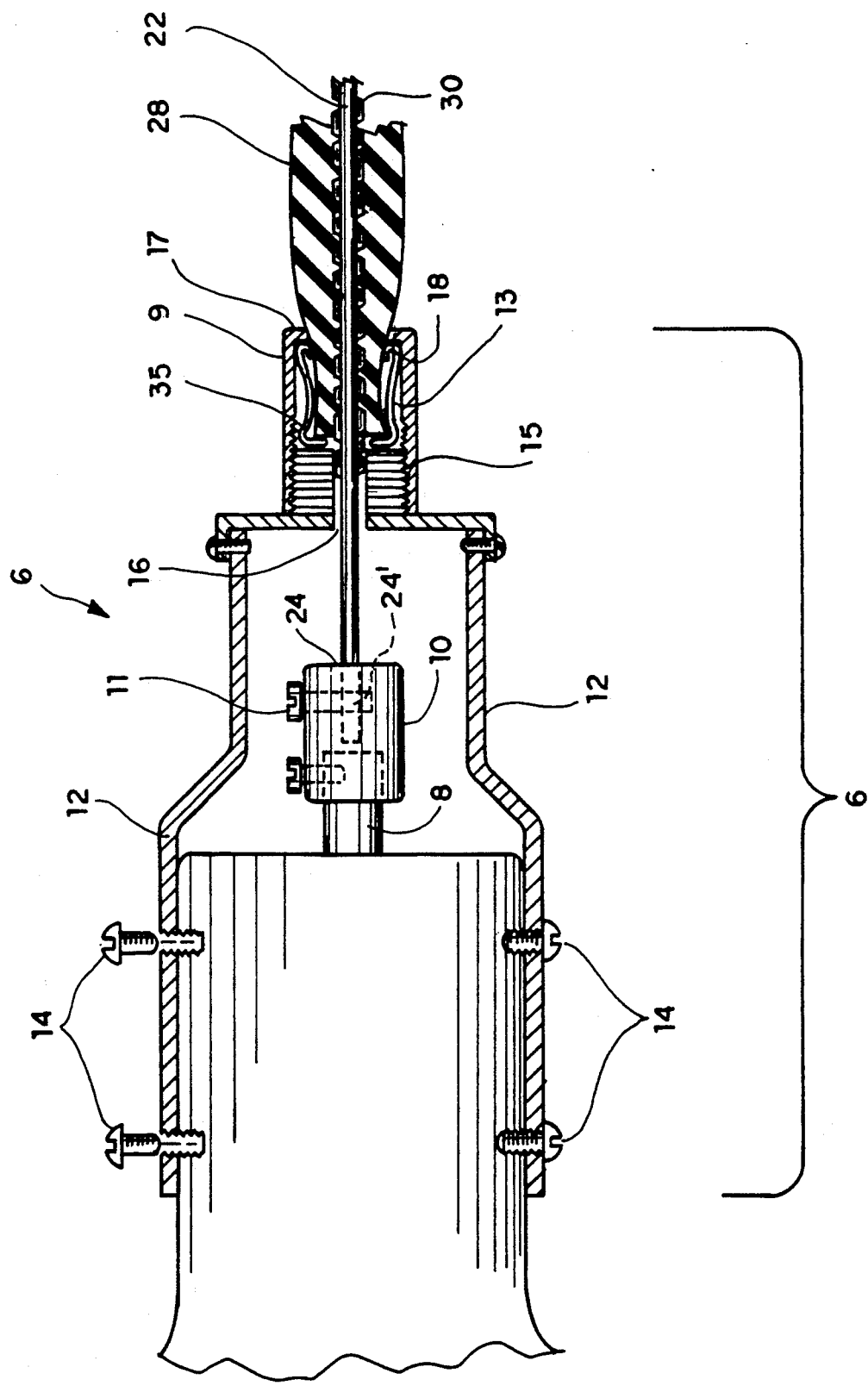

FLEXIBLE EXTENSION FOR A RECIPROCATING TOOL

FIELD OF THE INVENTION

The present invention relates to improvements in hand held cutting tools having a power unit and projecting reciprocating blade, and in particular to a flexible extension with a remote handle which supports the reciprocating blade.

DESCRIPTION OF THE PRIOR ART

Numerous past attempts exist to improve on this type of cutting tool, such a tool being known in the art as a saber saw. In U.S. Pat. No. 4,841,643, Collela et al. adapt a saber saw to be operated from a hand held drill. The translation of rotary to reciprocating motion is performed in the working head. This latter feature makes the working head undesirably large and unwieldy. Asbery, in U.S. Pat. No. 4,955,124, provides a flexible covered blade. This arrangement works well in the limited scope of the purpose of Asbery's tool, but the inability to flex in all directions leaves an unsolved need. Bjorklund, in U.S. Pat. No. 1,626,503, provides a multicable reciprocating driver for his saw blade. The use of a plurality of driving members, wherein two such members are required to move simultaneously in opposite directions, presents its own problems. These may include requiring separate jacketing of each drive member, which is illustrated in the Bjorklund patent, complicated lubrication schemes, or frequent replacement of the driving member. Each approach in the above cited cases entails consequences that threaten to reduce the utility of the tool.

SUMMARY OF THE INVENTION

An attachment to an existing reciprocating cutting tool is disclosed which comprises a single reciprocating flexible extension shaft enclosed within a flexible sheath. The simplicity inherent therein ensures that the flexible drive will be of limited diameter and weight, and therefore of maximum flexibility. The attachment fastens to the existing tool by uncomplicated fasteners. A handle and cutting surface guide are disposed on a working head in the form of a handle. The working head also has a mounting to retain a saw blade.

It is a principal object of the present invention to provide an extension attachment having a remote working head to an existing, hand held, reciprocating cutting tool.

It is a second object to provide such an attachment wherein the working end or handle is light, maneuverable, and sufficiently compact to enable a mechanic to cut curves, to cut around corners, and generally to perform precision or intricate cutting tasks in tight or otherwise inaccessible quarters.

A third object is to provide such an attachment wherein installation on an otherwise conventional, existing tool is quickly and simply performed.

Another object is to provide such an attachment wherein the blade is held in a fixed, although reciprocating, relationship to the handle of the working head.

Still another object is to provide such a tool having a single blade driving member.

A further object is to provide such an attachment which uses conventional blades and conventional mounting of a blade in the working head or handle.

Yet another object is to provide a power tool flexible extension that has universal, or nearly universal, flexure.

With these and other objects in view which will more readily appear as the nature of the invention is better understood, the invention resides in the novel combination and assembly of parts hereinafter more fully described, illustrated, and claimed with reference being made to the attached drawings.

BRIEF DESCRIPTION OF THE DRAWINGS

FIG. 2 is a top sectional view of the connection between the flexible extension of the invention and the conventional power unit as illustrated in FIG. 1B and drawn to an enlarged scale;

Similar reference characters designate corresponding parts throughout the several figures of the drawings.

DESCRIPTION OF THE PREFERRED EMBODIMENT

Figure 1A:
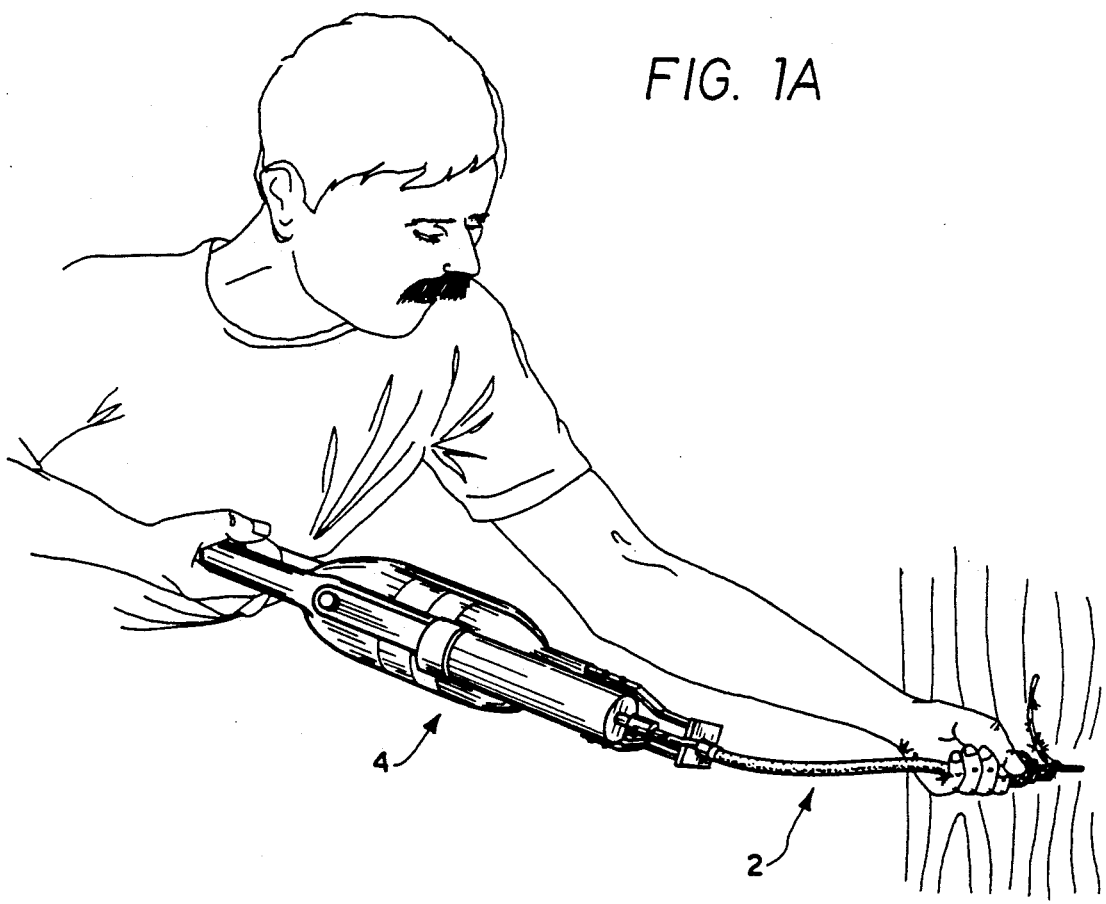
FIG. 1A is perspective view of the invention in use and as installed on an otherwise conventional power unit.
Figure 1B:
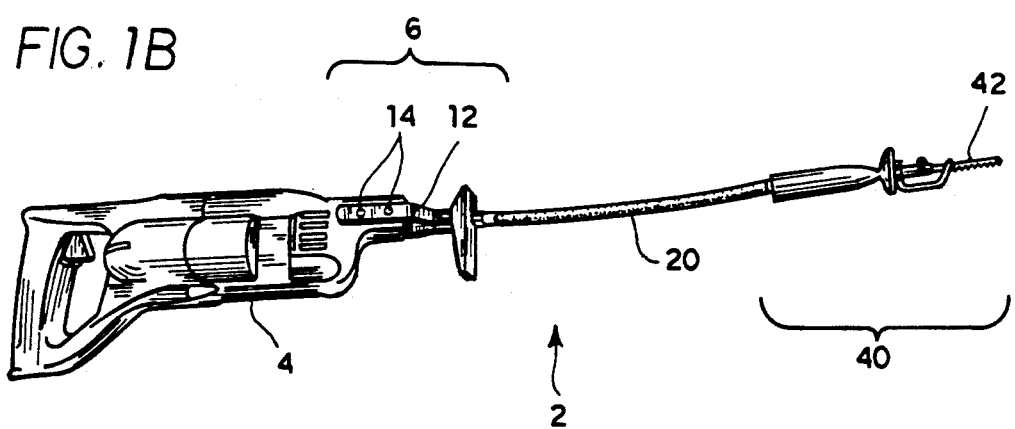
FIG. 1B is a side elevation view of the invention, somewhat in perspective, installed on a power unit.

The present invention 2 is shown installed on an existing hand held power unit 4 for a cutting tool in FIGS. 1A and 1B. The invention 2 generally comprises a connection 6 to the power unit 4, a flexible extension 20, and a working head 40 in the form of a handle and blade mounting assembly. The existing power unit 4, when conventionally used, causes rapid reciprocation of a drive shaft 8 and a socket 10 affixed to the drive shaft 8; drive shaft 8 and socket 10 are best shown in FIG. 2. The socket 10 conventionally holds a cutting blade 42, which cutting blade 42 is relocated in the present invention to the working head or handle 40.

Figure 3:
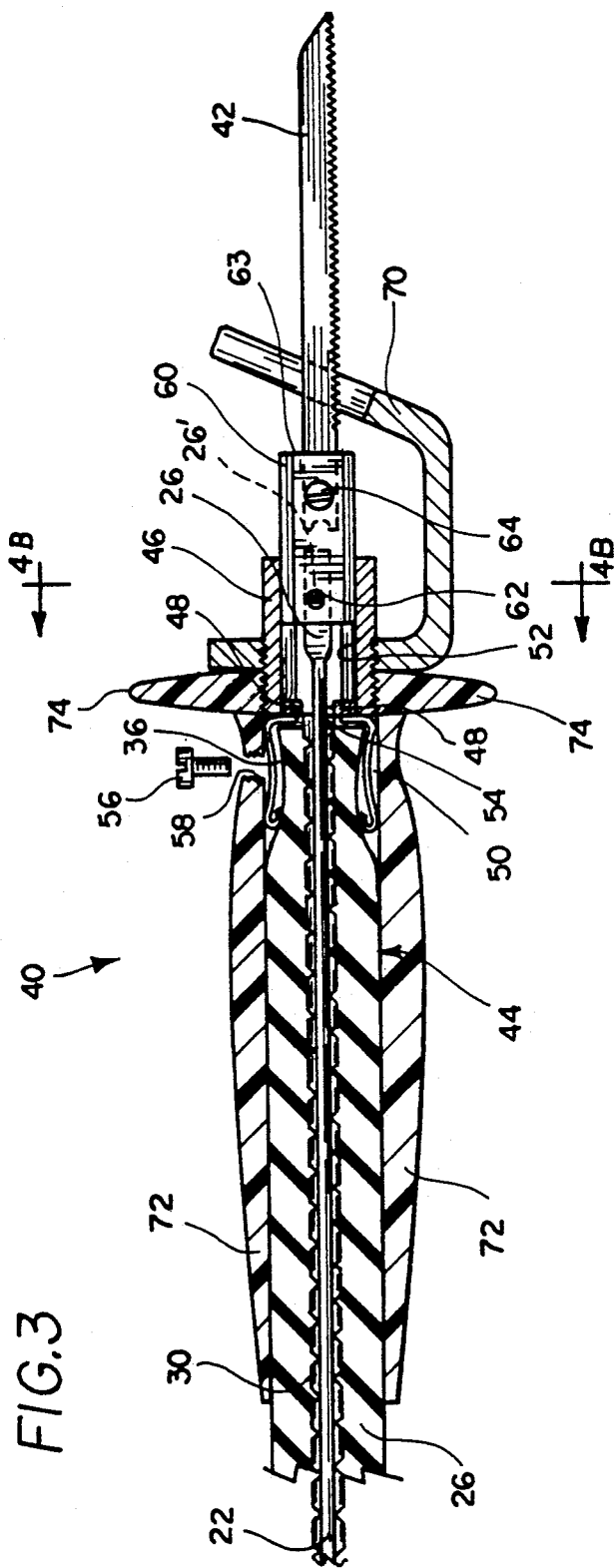
FIG. 3 is a side sectional view of the working head or handle and termination of the flexible extension of the invention as shown to the right in FIG. 1B and drawn to an enlarged scale.

Turning now to FIGS. 2 and 3, it will be seen that the flexible extension shaft 20 comprises flexible, non-reciprocating sheath 28 enclosing a flexible but strong reciprocating rod-like central member 22, which rod-like central member 22 terminates at proximal and distal ends 24,26 in eyes 24',26', respectively. It has been found that hardened stainless steel wire serves adequately in driving the cutting blade 42, even when subjected to the rapid reciprocation discussed above. The rod-like central member 22 is encased within a flexible, relatively stationary sheath 28. The sheath 28 is stationary in that while the rod-like central member 22 reciprocates, the sheath 28 is not displaced fore or aft relative to the power unit 4 or the working head or handle 40. Preferably, the extension cover or sheath 28 includes an interior, spiraled plastic coated metallic jacket 30. Also, if desired, sheath 28 could be made of two similar, concentric sheaths.

At proximal and distal ends 24,26, the flexible extension has rigid terminations or terminals 35,36, respectively. Each of the rigid terminations or terminals 35,36 partially surrounds and grips the metallic jacket 30 and the sheath cover 28. Each of the rigid terminations or terminals 35,36 further has an axial aperture which allows the rod-like central member 22 to pass therethrough. The eyes 24',26' are located outside the rigid terminations or terminals 35,36, and are thus exposed so they may be connected to the power unit 4 and to the working head or handle 40, respectively.

The connection 6 of the invention 2 comprises at least one attachment brace member 12 or bracket, the attachment member 12 having fasteners 14 (e.g., screws) to provide rigid attachment to the power unit 4. The connection 6 also holds the flexible extension 20 securely to the power unit 4.

Connection of the flexible sheath 28 to the power unit 4 is accomplished by a cap connector 9 which defines an interior chamber 13. Cap 9 may be joined to the attachment member 12 by mutual threading 15, for example. The attachment member 12 has an aperture 16 allowing the rod-like central member 22 of the flexible extension 20 to pass therethrough and gain access to the socket 10 of the power unit 4. A removable fastener 11, conventionally used to secure the cutting blade 42 to the socket 10, is now used to secure the rod-like central member 22 of the flexible extension 20 to the socket 10, by passing through the eye 24' of the proximal end 24 of the rod-like central member 22.

The cap 9 has an aperture 17 through which pass the stationary cover 28, rod 22 and jacket 30 of the flexible extension 20 from the surrounding chamber 13. This aperture 17 has a diameter smaller than that of the chamber 13. A shoulder 18 formed in the cap 9 allows a transition from the greater diameter of the surrounding chamber 13 to the lesser diameter of the aperture 17. Also, the shoulder 18 provides a seat for the rigid end 35 of the flexible extension 20, thereby holding the rigid end 35, and thus the stationary cover 28, in tight abutment against the attachment brace member 12.

Figure 4A:
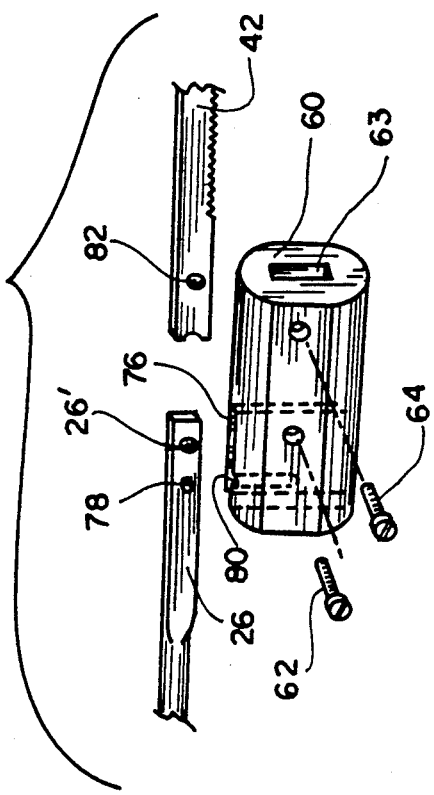
FIG. 4A is a perspective, exploded view of working head components.

Now, with particular reference to FIG. 3, the handle or working head 40 area of the invention will be discussed. A handle grip 72 surrounds the distal end of sheath 28, generally indicated at 44, and rigid termination or end 36 and includes a disc shaped guard 74. The grip 72 is retained on sheath 28 and terminal 36 by a suitable set screw 56 threaded through sheath 28 at 58 and engaging the annular side wall of terminal 36. As can be seen in FIG. 3, an annular space 50 is defined between the annular side wall of terminal 36 and the interior surface of handle grip 72. Mounted within and extending from guard 74 and terminal 36 is a slide mount body housing 46 with a chamber 52 formed interiorly and within which is mounted a slide mount 60 which interconnects rod end 26 and an otherwise conventional saw blade 42 as seen in FIG. 4A and discussed further below. Body 46 has an interior shoulder 48 adjacent terminal 36 of sheath 28 which may be formed separately, as shown, or made integrally with body 46; shoulder 48 and body 46 are welded or otherwise suitably attached to terminal 36 of sheath 28 for rigidity of construction.

Figure 4B:
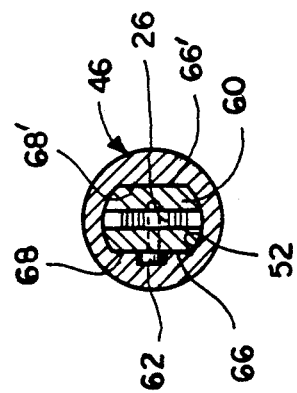
FIG. 4B is a section view drawn along lines 4B—4B of FIG. 3.

As can be seen in FIG. 4B, slide mount 60 is confined for reciprocal movement only with respect to body housing 46 by reason of cooperating flats 66, 66' formed on opposed sides of slide mount 60 mating with flats 68, 68', respectively, formed along opposed sides of chamber 52 within body housing 46.

With reference to FIG. 4A, the interconnection of rod end 26 and blade 42 will be explained. Rod end eye 26' slides downwardly into mounting recess 76 formed in the rear of mount 60 and is retained by a set screw 62 through eye 26'. If desired and for further rigidity of construction, rod end 26 may have a side button 78 received in a retention slot 80 formed along a wall of recess 76 as shown. The outer end of mount 60 has a blade mounting slot 63 formed therein to receive an otherwise conventional saw blade 42 having a mounting bore 82. A set screw 64 threaded into mount 60 and through bore 82 secures blade 42 in place.

With further reference to FIG. 3, a conventional base plate 70 is provided forwardly of and against guard 74; plate 70 limits bending of saw blade 42 during operation of the power tool.

Referring again to FIG. 1, it is readily appreciated that the power tool 4 is held in one hand and the invention 2 in the other hand as a cutting or sawing operation proceeds. It can be further appreciated from FIG. 1 that the invention 2 permits a sawing or other operation to be accomplished in close quarters or in an otherwise inaccessible location.

It is to be understood that the present invention is not limited to the sole embodiment described above, but encompasses any and all embodiments within the scope of the following claims.

I claim:

1. For use with an otherwise conventional hand held power tool driving a reciprocating and non-rotating drive shaft and having a non-rotating, reciprocating working element projecting therefrom, a flexible extension attachment assembly comprising;

a single, elongate, flexible, reciprocating extension shaft interposed between and directly interconnecting the power tool drive shaft and working element, whereby said flexible extension shaft and the power tool working member reciprocate in direct response to the reciprocating movement of the power tool drive shaft;

flexible sheath means concentric with and substantially encasing said flexible extension shaft and having a proximal end adjacent the power tool drive shaft and a distal end adjacent the power tool reciprocating working element;

first means affixing said sheath means proximal end to the power tool body, said sheath means and encased flexible drive shaft being dimensioned and configured such that said flexible drive shaft is free to reciprocate within said sheath means;

handle means fixedly surrounding said sheath means distal end; and guide means located interiorly of said handle means for preventing rotational displacement of said handle means, said sheath means, said flexible extension means, and the working element relative to one another, and assuring unidirectional reciprocation only of the power tool working member with respect to the handle means whereby any twisting movement of said handle means about its length causes the power tool working element to change its orientation accordingly in response to said handle twisting movement;

whereby, in use, said handle means and the power tool are grasped and the power tool working element may be extended and precisely guided into otherwise inaccessible locations to perform useful work.

2. The invention as claimed in claim 1 wherein said flexible extension shaft comprises an elongate flexible rod.

3. The invention as claimed in claim 2 wherein said rod is fabricated from stainless steel wire.

4. The invention as claimed in claim 1 wherein said sheath means comprise an outer flexible jacket and an inner flexible, metallic jacket concentric with and closely adjacent said flexible extension shaft.

5. The invention as claimed in claim 4 wherein said inner metallic jacket is fabricated of a length of tightly wound coil steel.

6. The invention as claimed in claim 1 wherein said first means affixing said sheath means proximal end to the power tool body comprise bracket means surrounding the power tool drive shaft and a mounting and guide cap means on said bracket means fixing said sheath proximal end to said bracket means, there further being means defining an aperture centrally through said cap means, said flexible shaft extending from the power tool drive shaft through said cap aperture and into said flexible sheath.

7. The invention as claimed in claim 1 wherein said handle means further comprise a power tool working element guide extended away therefrom and from said flexible sheath distal end.

8. The invention as claimed in claim 1 wherein said guide means comprise an open ended body fixed to said handle and extending away therefrom, means defining a non-cylindrical elongate chamber within said body, and a power tool working element mounting block interconnecting said flexible shaft and the working element and having an external configuration mating said non-cylindrical elongate chamber and fitted therewithin for reciprocal movement only with respect thereto.

9. The invention as claimed in claim 1 wherein said handle means further include a protective handle guard about an end of said handle means adjacent the power tool working element.

10. The invention as claimed in claim 1 further comprising, in combination, an otherwise conventional power tool having a reciprocating drive shaft and a working element driven from said drive shaft by said flexible drive shaft.

11. The invention as claimed in claim 10 wherein said power tool is a power saber saw and said working element is a saber saw blade.

12. For use with an otherwise conventional hand held power saber saw driving a reciprocating and non-rotating drive shaft and having a non-rotating, reciprocating saber saw blade projecting therefrom, a flexible extension attachment assembly comprising;

a single, elongate, flexible, reciprocating extension shaft interposed between and directly interconnecting the power saber saw drive shaft and saber saw blade, whereby said flexible extension shaft and the saber saw blade reciprocate in direct response to the reciprocating movement of the power saber saw drive shaft;

flexible sheath means concentric with and substantially encasing said flexible extension shaft and having a proximal end adjacent the power saber saw drive shaft and a distal end adjacent the power saber saw reciprocating saber saw blade;

first means affixing said sheath means proximal end to the power tool body, said sheath means and encased flexible drive shaft being dimensioned and configured such that said flexible drive shaft is free to reciprocate within said sheath means;

handle means fixedly surrounding said sheath means distal end;

guide means located interiorly of said handle means for preventing rotational displacement of said handle means, said sheath means, said flexible extension means, and the saber saw blade relative to one another, and assuring unidirectional reciprocation only of the power saber saw blade with respect to the handle means whereby any twisting movement of said handle means about its length causes the power saber saw blade to change its orientation accordingly in response to said handle twisting movement;

said guide means comprising an open ended body fixed to said handle and extending away therefrom with means defining a non-cylindrical elongate chamber within said body, and a power saber saw blade mounting block interconnecting said flexible shaft and the saber saw blade and having an external configuration mating said non-cylindrical elongate chamber and fitted therewithin for reciprocal movement only with respect thereto;

whereby, in use, said handle means and the power saber saw are grasped and the power saber saw blade may be extended and precisely guided into otherwise inaccessible locations to perform useful work.

* * * * *